United States Patent
Derenes et al.

(10) Patent No.: US 8,272,203 B2
(45) Date of Patent: Sep. 25, 2012

(54) EXTERNAL FAN DUCT CASING IN A TURBOMACHINE

(75) Inventors: Jacky Raphael Michel Derenes, Corbeil-Essonnes (FR); Delphine Edith Dijoud, Paris (FR); Sebastien Regard, Maisons Alfort (FR)

(73) Assignee: Snecma, Paris (FR)

( * ) Notice: Subject to any disclaimer, the term of this patent is extended or adjusted under 35 U.S.C. 154(b) by 1054 days.

(21) Appl. No.: 12/177,369

(22) Filed: Jul. 22, 2008

(65) Prior Publication Data

US 2010/0047066 A1 Feb. 25, 2010

(30) Foreign Application Priority Data

Jul. 26, 2007 (FR) ...................................... 07 05455

(51) Int. Cl.
*F02K 3/02* (2006.01)
(52) U.S. Cl. ............. 60/226.1; 60/796; 60/797; 60/798; 415/213.1
(58) Field of Classification Search .... 415/213.1–215.1; 60/226.1, 796–798; 244/53 R, 54

See application file for complete search history.

(56) References Cited

U.S. PATENT DOCUMENTS

| | | | | |
|---|---|---|---|---|
| 2,286,908 A | * | 6/1942 | Goddard | 244/73 R |
| 2,421,689 A | * | 6/1947 | Elkin | 244/130 |
| 3,449,914 A | * | 6/1969 | Brown | 405/215 |
| 4,471,609 A | * | 9/1984 | Porter et al. | 60/797 |
| 7,318,619 B2 | * | 1/2008 | Munro et al. | 296/180.1 |
| 2005/0022501 A1 | | 2/2005 | Eleftheriou et al. | |

FOREIGN PATENT DOCUMENTS

| | | |
|---|---|---|
| EP | 0 289 376 A1 | 11/1988 |
| EP | 1 568 868 A2 | 8/2005 |
| GB | 536461 | 5/1941 |
| GB | 2 280 484 | 2/1995 |

* cited by examiner

*Primary Examiner* — Ajay K Arora
(74) *Attorney, Agent, or Firm* — Oblon, Spivak, McClelland, Maier & Neustadt, L.L.P.

(57) ABSTRACT

Twin-flow turbo-jet engine, comprising a cylindrical casing externally defining an annular flow space for a secondary flow, wherein the cylindrical casing is formed from a lattice framework and from removable cowling panels fixed to the framework, said framework comprising an upstream annular flange for fixing to an intermediate housing, a downstream annular flange for connecting to an exhaust housing and rigid beams parallel or inclined relative to the axis of the turbo-jet engine, connecting the two flanges to one another.

14 Claims, 1 Drawing Sheet

EXTERNAL FAN DUCT CASING IN A TURBOMACHINE

BACKGROUND OF THE INVENTION

The present invention relates to a fan duct for a turbomachine such as an aircraft turbo-jet engine.

The fan duct (often referred to as a "bypass duct") of a turbomachine extends around the engine of the turbomachine, between the fan and the exhaust pipe, and comprises two substantially cylindrical coaxial walls which define therebetween an annular flow space for one portion of the air drawn in by the fan, forming a cold flow or secondary flow. The other portion of the air drawn in by the fan passes into the engine of the turbomachine which comprises, from upstream to downstream, a compressor, a combustion chamber and a turbine, and forms the hot flow or primary flow.

The internal wall of the duct is fixed at its upstream end to an intermediate housing of the turbomachine and is connected at its downstream end to an exhaust housing. It is shaped to surround the engine of the turbomachine at a short radial distance.

The external wall of the duct is fixed at its upstream end to the intermediate housing and at its downstream end to a suspension and centering system which is connected to the exhaust housing and which is generally located upstream of a thrust reversing system. It ensures the aerodynamic shaping of the secondary flow and may also play a structural role in the transmission of forces such as the suspension forces of the engine or thrust reversing forces and minimizing the occurrence of distortion of the carcass in the turbo-jet engine.

DESCRIPTION OF THE PRIOR ART

In the prior art, in particular in the case of turbo-jet engines attached to the rear part of the fuselage of the aircraft, the external wall of the duct consists of a one-piece part of substantially cylindrical shape, which is not shaped to be able to be opened and which causes difficulty in accessing the engine for maintenance operations. More specifically, the significant structural role of this part in this type of turbo-jet engine prevents the creation at that point of anything other than very small access traps which do not allow access to the equipment and to the nozzles distributed over the entire circumference of the engine.

SUMMARY OF THE INVENTION

The object of the invention is, in particular, to provide a simple, economic and efficient solution to these problems, making it possible to avoid the drawbacks of the prior art, and aiming in particular to improve access to the engine during maintenance operations and to reduce thereby the duration of stoppage times of the aircraft, whilst ensuring an efficient transmission of the forces of the engine to the aircraft and good rigidity of the turbo-jet engine.

To this end, the invention proposes a twin-flow turbo-jet engine, comprising a substantially cylindrical casing mounted downstream of an intermediate housing and externally defining an annular flow space for a secondary flow around the turbo-jet engine, wherein the cylindrical casing is formed from a lattice framework and from removable cowling panels fixed to this framework, said framework comprising an upstream annular flange for fixing to the intermediate housing, a downstream annular flange for connecting to an exhaust housing and rigid beams connecting the two flanges to one another.

The invention thus proposes to separate the structural parts and the aerodynamic parts of the external casing of the fan duct of the turbo-jet engine, to facilitate maintenance operations considerably.

More specifically, to access the inside of the turbo-jet engine according to the invention, it suffices to remove the cowling panels from the lattice framework of the external casing of the fan duct. The access is made particularly simple by the shape of this lattice framework, composed essentially of two flanges, respectively upstream and downstream, and of rigid beams connecting these two flanges. This shape facilitates access to the equipment and to the nozzles which are regularly distributed over the entire circumference of the turbo-jet engine.

The shape of the cowling panels may be selected so as to optimize their aerodynamic performance without any impact on the structural quality of the lattice framework of the cylindrical casing.

The use of rigid beams, which confer on the framework its lattice pattern, makes it possible to improve the transmission of forces in the framework by distributing the absorption of forces over extended areas. The rigidity of this structure makes it possible to allow a portion of the shearing forces passing into the propulsive assembly to pass through said structure and thus to limit the transmission of these forces by the engine itself, which allows a significant reduction in the occurrence of distortion of the carcass, which generally impairs the performance of the turbo-jet engine. The fixing points of the rigid beams to the annular flanges may be selected to optimize the transmission of forces. However, it may be advantageous to select a slightly different location for some of these fixing points in order to facilitate the access to specific areas of the engine during maintenance operations.

More generally, the architecture of the external casing of the fan duct according to the invention also allows a reduction of the mass and of the manufacturing cost of this external casing.

DESCRIPTION OF THE PREFERRED EMBODIMENTS

Advantageously, the lattice framework comprises beams parallel to the axis and/or beams inclined relative to the axis, which connect the upstream annular flange to the downstream annular flange, and which are regularly distributed about the axis.

According to a first variant of the invention, the lattice framework comprises rigid beams inclined relative to the axis which divide the casing into areas of substantially triangular shape and of substantially equal dimensions, each of these beams having an upstream end fixed to the upstream annular flange and a downstream end fixed to the downstream annular flange.

This particularly simple zigzag lattice pattern is characterized by an excellent transmission of forces.

According to a further variant of the invention, the lattice framework comprises an intermediate reinforcing ring arranged coaxially between the upstream and downstream annular flanges and connected to the upstream and downstream beams by straight, rigid beams and/or beams which are inclined relative to the axis.

This second lattice pattern may be advantageous for relatively long fan ducts or generally to improve further the rigidity of the structure, as the presence of the intermediate reinforcing ring allows the use of shorter beams.

Preferably, each rigid inclined beam forms the same angle α with each of the two adjacent beams.

According to a further feature of the invention, the cowling panels comprise a coating providing acoustic protection.

The absence of traps created in these panels and their large surface area allows improved acoustic treatment of the fan duct and thus an improved reduction of the acoustic disturbance caused by the turbo-jet engine.

The lattice framework may be produced from metal and may be in one piece or may be formed from elements which are mechanically welded or bolted together.

Alternatively, the lattice framework may be formed from elements made of composite material which are screwed together, riveted or bonded.

According to a further feature of the invention, modules for equipment are fixed to the annular flanges of the lattice framework of the cylindrical casing.

BRIEF DESCRIPTION OF THE DRAWINGS

The invention will be better understood and further details, advantages and features of the invention will become more apparent by reading the following description made by way of non-limiting example, with reference to the accompanying drawings, in which:

FIG. 1 shows a twin-flow turbo-jet engine 10 surrounded by a nacelle 12 (shown in section) and essentially comprising, upstream to downstream, a fan housing 14, an intermediate housing 16, a fan duct formed from two substantially cylindrical coaxial casings, respectively internal 18 and external 20, and a mixer 22 surrounding the upstream part of an exhaust cone 24 mounted downstream of an exhaust housing. The internal casing 18 of the fan duct is generally known as the I.F.D. (Inner Fan Duct) whilst the external casing 20 is generally known as the O.F.D. (Outer Fan Duct).

Figure 1:
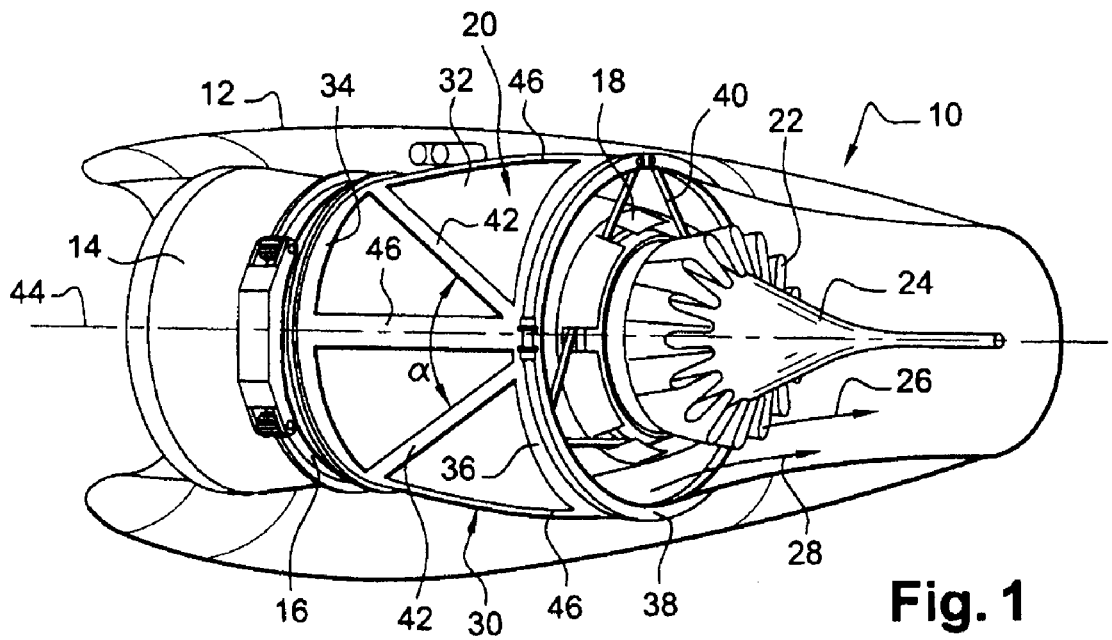
FIG. 1 is a schematic view in perspective of a first variant of turbo-jet engine according to the invention.

The fan housing 14 surrounds a fan impeller driven in rotation by the turbine of the turbo-jet engine, in a manner well known by the person skilled in the art. During the operation of the engine, the fan generates a secondary air flow, which flows toward the rear around the turbo-jet engine between the internal 18 and external 20 cylindrical casings, and which provides a portion of the thrust of the engine. One portion of the air entering the engine supplies the inlet compressor of the turbo-jet engine, and is then mixed with fuel in the combustion chamber. The combustion gases 26 emerging from the combustion chamber pass into the turbine, are then ejected into an exhaust housing and leave the turbo-jet engine through the mixer 22 flowing along the exhaust cone 24 so as to be mixed with the secondary flow 28 originating from the fan duct.

According to the invention, the external casing 20 of the fan duct is formed from a framework 30 on which are fixed removable cowling panels 32, intended to guide the secondary flow. This framework 30 comprises an upstream annular flange 34 by which it is fixed to an annular flange of the intermediate housing 16, for example by bolting together. The framework 30 also comprises a downstream annular flange 36 for fixing to a suspension ring 38 which is carried by connecting rods 40, for example three in number, connected to the exhaust housing in a well-known manner.

The two flanges 34, 36 of the framework 30 of the external casing 20 are, according to the invention, connected by beams 42 which are rigid and inclined relative to the axis 44 of the turbo-jet engine. These flanges are preferably also connected by longitudinal beams 46 i.e. parallel to the axis of the turbo-jet engine. As FIG. 1 shows, the framework 30 of the external casing may, for example, comprise four longitudinal beams 46 regularly distributed around the axis 44 of the turbo-jet engine and defining four cylindrical portions of generally rectangular shape. Each cylindrical portion is divided, substantially along one of its diagonals, by one of the inclined beams 42, thus defining two areas of generally triangular shape. In the configuration shown in FIG. 1, in which the framework 30 has an optimal rigidity and capacity for absorbing forces, the inclined beams 42 are arranged in a zigzag pattern, i.e. each beam 42 is fixed to the upstream flange 34 in an area in the vicinity of the area for fixing one of the two adjacent beams 42 to this flange, and is fixed to the downstream flange 36 in an area in the vicinity of the area for fixing the other of the adjacent beams 42 to this flange, so that the assembly of the inclined beams 42 provides the framework 30 with a lattice pattern.

The cowling panels 32 each have a shape corresponding substantially to a triangular area of the lattice framework 30, so as to be able to be fixed to the inclined 42 and longitudinal 46 beams and also to the upstream 34 and downstream 36 annular flanges, this fixing being able to be implemented conventionally, for example by bolting together. These panels comprise on their internal surface an acoustic coating similar to that used conventionally in certain areas of the internal face of the nacelle 12, for example in the region of the air inlet duct.

During flight, the lattice structure of the framework 30 of the external casing 20 makes it possible to improve the distribution of the forces absorbed by the framework, such as the suspension forces of the engine, in particular due to the arrangement of the rigid inclined beams 42. Due to its improved rigidity, the framework also provides improved behavior regarding the counterthrust loads when a thrust reversing system mounted downstream of the fan duct is used, and makes it possible, in a more general manner, to limit the shearing forces passing through the engine and thus to reduce the occurrence of distortion of the carcass.

The cowling panels 32 according to the invention further provide a greater surface area for the acoustic treatment than conventional external casings of fan ducts, which are provided with traps for access to the engine.

When stationary, the cowling panels 32 may be easily removed so as to allow easy access to the engine through the lattice framework 30. The invention makes it possible, in particular, to access the equipment and the nozzles arranged all around the engine.

The arrangement of the inclined beams 42 disclosed above and shown in FIG. 1 provides maximum rigidity, but it may be advantageous to select a slightly different arrangement in order to open up access to specific areas of the engine by preventing them from being concealed by one of these beams 42.

Figure 2:
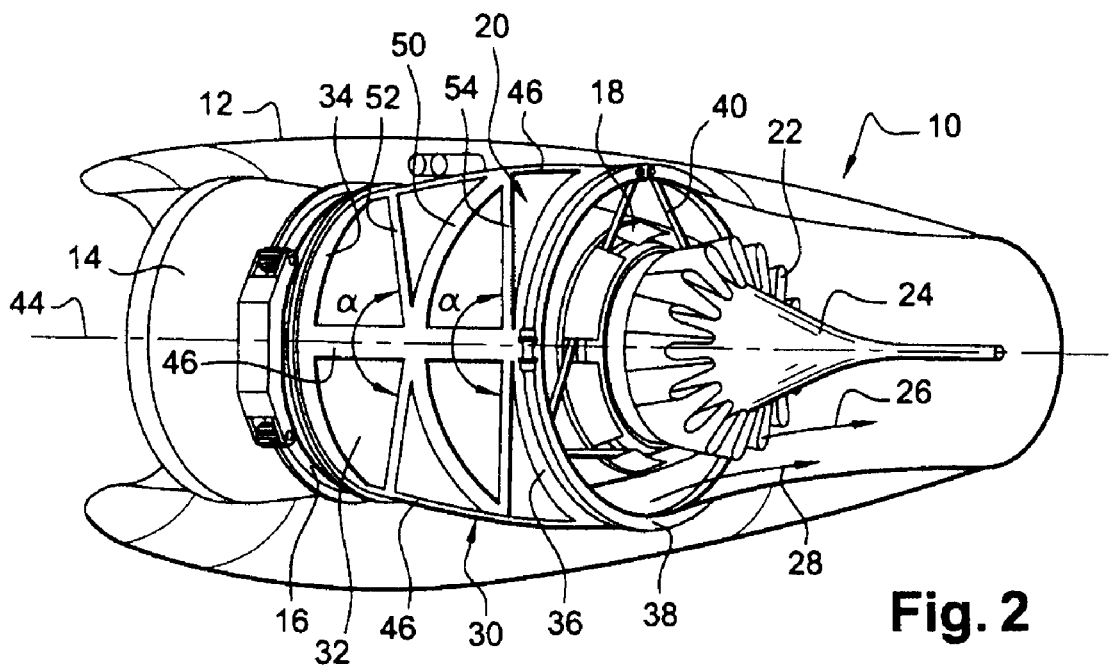
FIG. 2 is a schematic view in perspective of a second variant of turbo-jet engine according to the invention.

In FIG. 2, the external casing 20 of the fan duct of the turbo-jet engine 10 further comprises an intermediate reinforcing ring 50 integrated in the framework 30 of this external casing. This reinforcing ring 50 is arranged coaxially with the upstream 34 and downstream 36 flanges, approximately halfway between the two flanges, and divides each of the four cylindrical portions defined by the longitudinal reinforcing beams 46 into two areas of generally rectangular shape, so that the framework 30 comprises four cylindrical portions upstream of the reinforcing ring 50 and four cylindrical portions downstream of this reinforcing ring.

The framework 30 comprises two assemblies of rigid inclined beams 52, 54 arranged in a similar manner to the inclined beams of the first variant of the invention, shown in FIG. 1. More specifically, the framework comprises upstream four first inclined beams 52 arranged in a zigzag pattern and connecting the upstream annular flange 34 to the intermediate reinforcing ring 50, each extending along the diagonal of one of the four cylindrical portions located upstream of the reinforcing ring 50. Downstream, the framework 30 comprises four second inclined beams 54 also arranged in a zigzag pattern, and connecting the intermediate reinforcing ring 50 to the downstream annular flange 36, each extending along the diagonal of one of the four cylindrical portions located downstream of the reinforcing ring 50.

In this second variant of the invention, taking account of the presence of the intermediate reinforcing ring 50, the inclined beams 52 and 54 are shorter than those of the first variant, and the triangular zones are less extended, which provides this structure with further increased rigidity. This variant thus proves to be particularly well adapted to relatively long turbo-jet engines or those capable of generating forces which are too high for the simple lattice structure of the first variant.

Generally, the invention allows a weight gain in addition to a reduction in the manufacturing cost of the external casing of the fan duct, by the division of this casing into a rigid framework on the one hand, fulfilling the structural functions of the casing, and into cowling panels on the other hand, which fulfill the aerodynamic and acoustic functions of the casing.

The invention claimed is:

1. A twin-flow turbo-jet engine having a longitudinal axis, comprising a substantially cylindrical casing mounted downstream of an intermediate housing and externally defining an annular flow space for a secondary flow around the turbo-jet engine, wherein the cylindrical casing is formed from a lattice framework and from removable cowling panels fixed to the framework, said framework comprising at least one upstream annular flange for fixing to the intermediate housing, a downstream annular flange for connecting to an exhaust housing and rigid beams connecting the two flanges to one another.

2. The turbo-jet engine as claimed in claim 1, wherein the lattice framework comprises a first plurality of beams parallel to the longitudinal axis and regularly distributed about the longitudinal axis.

3. The turbo-jet engine as claimed in claim 2, wherein the lattice framework comprises a second plurality of rigid beams inclined relative to the longitudinal axis, each of the rigid beams of said second plurality having an upstream end fixed to the upstream annular flange and a downstream end fixed to the downstream annular flange.

4. The turbo-jet engine as claimed in claim 1, wherein the lattice framework comprises an intermediate reinforcing ring arranged coaxially between the upstream and downstream annular flanges and connected by beams to the upstream and downstream annular flanges.

5. The turbo jet engine as claimed in claim 3, wherein the inclined beams are arranged in a zigzag pattern between the annular flanges.

6. The turbo jet engine as claimed in claim 3, wherein each inclined beam forms the same angle α with each of the two adjacent beams.

7. The turbo-jet engine as claimed in claim 1, wherein the cowling panels comprise a coating providing acoustic protection.

8. The turbo-jet engine as claimed in claim 1, wherein the lattice framework is produced from metal and is in one piece or formed from elements which are mechanically welded or bolted together.

9. The turbo-jet engine as claimed in claim 1, wherein the lattice framework is formed from elements made of composite material which are screwed together, riveted or bonded.

10. The turbo-jet engine as claimed in claim 1, wherein modules for equipment are fixed to the annular flanges of the lattice framework.

11. The turbo-jet engine as claimed in claim 1, further comprising a fan housing upstream of said intermediate housing, and a fan duct downstream of said intermediate housing, wherein said fan duct comprises an internal casing and said cylindrical casing being externally and coaxially located relative to said internal casing, said internal casing and cylindrical casing defining said annular flow space for said secondary flow.

12. The turbo-jet engine as claimed in claim 3, where the rigid beams from said first and second pluralities of rigid beams form a plurality of triangular shaped zones within said framework.

13. The turbo-jet engine as claimed in claim 3, wherein the lattice framework comprises an intermediate reinforcing ring arranged coaxially between the upstream and downstream annular flanges and connected by beams to the upstream and downstream annular flanges.

14. The turbo jet engine as claimed in claim 13, wherein the inclined beams are arranged in a zigzag pattern between the upstream and downstream annular flanges.

* * * * *